United States Patent [19]
Peltonen et al.

[11] Patent Number: 5,685,003
[45] Date of Patent: Nov. 4, 1997

[54] METHOD AND SYSTEM FOR AUTOMATICALLY INDEXING DATA IN A DOCUMENT USING A FRESH INDEX TABLE

[75] Inventors: Kyle Gordon Peltonen; Bartosz Milewski, both of Redmond, Wash.

[73] Assignee: Microsoft Corporation, Redmond, Wash.

[21] Appl. No.: 329,810

[22] Filed: Oct. 26, 1994

Related U.S. Application Data

[63] Continuation of Ser. No. 995,796, Dec. 23, 1992, abandoned.

[51] Int. Cl.$^6$ ............................ G06F 17/21; G06F 17/30
[52] U.S. Cl. ..................... 395/793; 395/772; 395/619; 395/601; 395/603; 395/761
[58] Field of Search .................... 364/419.19, 419.1, 364/419.01, 419.17; 395/600, 182.13, 601, 603, 619, 712, 761, 792, 793, 772; 369/47, 59

[56] References Cited

U.S. PATENT DOCUMENTS

| | | | |
|---|---|---|---|
| 4,498,142 | 2/1985 | Advani et al. | 395/156 |
| 4,754,326 | 6/1988 | Kram et al. | 395/600 |
| 4,760,526 | 7/1988 | Takeda et al. | 395/600 |
| 4,768,144 | 8/1988 | Winter et al. | 395/600 |
| 4,817,032 | 3/1989 | Ohata et al. | 395/425 |
| 4,819,156 | 4/1989 | DeLorme et al. | 395/182.13 |
| 4,827,462 | 5/1989 | Flannagan et al. | 369/32 |
| 4,875,159 | 10/1989 | Cary et al. | 395/600 |
| 4,961,139 | 10/1990 | Hong et al. | 395/600 |
| 5,020,019 | 5/1991 | Ogawa | 395/600 |
| 5,051,745 | 9/1991 | Katz | 341/51 |
| 5,119,291 | 6/1992 | Flannagan et al. | 395/404 |
| 5,129,082 | 7/1992 | Tirfing et al. | 395/600 |
| 5,153,831 | 10/1992 | Yianilos | 364/419.13 |
| 5,193,180 | 3/1993 | Hastings | 395/183.11 |
| 5,202,982 | 4/1993 | Gramlich et al. | 395/600 |
| 5,204,958 | 4/1993 | Cheng et al. | 395/600 |
| 5,247,437 | 9/1993 | Vale et al. | 364/419.19 |
| 5,251,316 | 10/1993 | Anick et al. | 395/600 |
| 5,293,616 | 3/1994 | Flint | 395/600 |
| 5,347,653 | 9/1994 | Flynn et al. | 395/600 |
| 5,404,510 | 4/1995 | Smith et al. | 395/600 |

OTHER PUBLICATIONS

Dalton, Gerard, *Automatic Text Processing*, "Conventional Text-Retrieval Systems", pp. 229-274.

*Primary Examiner*—Gail O. Hayes
*Assistant Examiner*—Joseph Thomas
*Attorney, Agent, or Firm*—Seed and Berry LLP

[57] ABSTRACT

A system and method for indexing words in documents, the system including a master index for storing the words and for storing associated index data. One of the documents is selected for updating and is edited. Next, a shadow index is created. Each word from the selected edited document is then indexed in the shadow index. A fresh index table is updated to indicate that the shadow index contains the most up-to-date data regarding the selected edited document. Query requests will be processed by searching all relevant indexes and comparing the retrieved results with the data in the fresh index table. Only the most up-to-date data will actually be returned as the query results. Periodically, shadow indexes and the master index can be merged into a new master index. Only the most up-to-date data, as determined by a comparison with the fresh index table, will be stored in the new master index.

35 Claims, 23 Drawing Sheets

Document Index — 201

| Keyword (202) | (Document Identifier (203), (Occurrence) (204)) |
|---|---|
| Areas | (B, 12) |
| Cases | (A, 6) |
| Congress | (B, 1) |
| Court | (A, 10) |
| Courts | (A, 3, 16) (B, 6) |
| Created | (B, 3) |
| Disputes | (B, 9) |
| District | (A, 15) |
| Federal | (A, 9, 14) (B, 5) |
| Handle | (B, 8) |
| Law | (B, 14) |
| Most | (A, 5) |
| Particular | (B, 11) |
| Specialized | (B, 4) |
| System | (A, 11) |
| Trial | (A, 2) |

205 Tuple { (first row)
206 (entries)

*Figure 2*

(Old) Document Index 201

| Keyword 202 | (Document Identifier 203, (Occurrence) 204) |
|---|---|
| Areas | (B, 12) |
| Cases | (A, 6) |
| Congress | (B, 1) |
| Court | (A, 10) |
| Courts | (A, 3, 16) (B, 6) |
| Created | (B, 3) |
| Disputes | (B, 9) |
| District | (A, 15) |
| Federal | (A, 9, 14) (B, 5) |
| Handle | (B, 8) |
| Law | (B, 14) |
| Most | (A, 5) |
| Particular | (B, 11) |
| Specialized | (B, 4) |
| System | (A, 11) |
| Trial | (A, 2) |

Temporary Index 401

| Keyword | (Document Identifier, (Occurrence)) |
|---|---|
| Appellate | (A, 4) |
| Court | (A, 5, 15) |
| Federal | (A, 14) |
| Similar | (A, 11) |
| States | (A, 9) |
| System | (A, 16) |
| Systems | (A, 6) |
| Trial | (A, 2) |

(New) Document Index 402

| Keyword | (Document Identifier, (Occurrence)) |
|---|---|
| Appellate | (A, 4) |
| Areas | (B, 12) |
| Congress | (B, 1) |
| Court | (A, 5, 15) |
| Courts | (B, 6) |
| Created | (B, 3) |
| Disputes | (B, 9) |
| Federal | (A, 14) (B, 5) |
| Handle | (B, 8) |
| Law | (B, 14) |
| Particular | (B, 11) |
| Similar | (A, 11) |
| Specialized | (B, 4) |
| States | (A, 9) |
| System | (A, 16) |
| Systems | (A, 6) |
| Trial | (A, 2) |

*Figure 4*

DATA REPOSITORY

| Changes Table 801 | | Fresh Index Table 802 | |
|---|---|---|---|
| Document Identifier 804 | Time Stamp 805 | Document Identifier 812 | Index Identifier 813 |
| | | | |

INDEXES 803

| Master Index 808 | | Persistent Shadow Index 807 | |
|---|---|---|---|
| Keyword | (Document Identifier, (Occurrences)) | Keyword | (Document Identifier, (Occurrences)) |
| | | | |

| Volatile Shadow Index 806 | |
|---|---|
| Keyword 809 | (Document Identifier 810, (Occurrences) 811) |
| | |

*Figure 8*

Master Index 1401

| Keyword 2402 | Document Identifier, 2403 (Occurrences) 2404 |
|---|---|
| Any | (B, 1) |
| Bill | (B, 9) |
| Congress | (A, 4) (C, 7) |
| Consists | (A, 5) |
| Either | (B, 4) |
| Enact | (C, 9) |
| Follow | (C, 3) |
| House | (A, 13) (B, 5) |
| Houses | (A, 8) |
| Introduce | (B, 7) |
| Legislatures | (C, 2) |
| Member | (B, 2) |
| Processes | (C, 4) |
| Representatives | (A, 15) |
| Senate | (A, 10) |
| Similar | (C, 5) |
| State | (C, 1) |
| States | (A, 3) |
| Statutes | (C, 10) |
| Two | (A, 7) |
| United | (A, 2) |

*Figure 14*

Shadow Index D — 1601

| Keyword | (Document Identifier, (Occurrences)) |
|---|---|
| After | (A, 1) |
| Assigned | (A, 8) |
| Bill | (A, 3) |
| Committee | (A, 12) |
| Introduced | (A, 5) |
| Standing | (A, 11) |

Master Index — 1401

| Keyword | (Document Identifier, (Occurrences)) |
|---|---|
| Any | (B, 1) |
| Bill | (B, 9) |
| Congress | (A, 4) (C, 7) |
| Consists | (A, 5) |
| Either | (B, 4) |
| Enact | (C, 9) |
| Follow | (C, 3) |
| House | (A, 13) (B, 5) |
| Houses | (A, 8) |
| Introduce | (B, 7) |
| Legislatures | (C, 2) |
| Member | (B, 2) |
| Processes | (C, 4) |
| Representatives | (A, 15) |
| Senate | (A, 10) |
| Similar | (C, 5) |
| State | (C, 1) |
| States | (A, 3) |
| Statutes | (C, 10) |
| Two | (A, 7) |
| United | (A, 2) |

Shadow Index E — 1602

| Keyword | (Document Identifier, (Occurrences)) |
|---|---|
| Bill | (B, 9) |
| Committee | (B, 2) |
| Consideration | (B, 17) |
| Senate | (B, 15) |
| Send | (B, 11) |
| Table | (B, 7) |
| Votes | (B, 3) |
| Whether | (B, 5) |

*Figure 16*

Fresh Index Table — 1701

| Document Identifier | Index Identifier |
|---|---|
| A | Index D |
| B | Index E |

*Figure 17*

Shadow Index F — 1801

| Keyword | Document Identifier, (Occurrences) |
|---|---|
| After | (A, 1) |
| Assigned | (A, 8) |
| Bill | (A, 3) (B, 9) |
| Committee | (A, 12) (B, 2) |
| Consideration | (B, 17) |
| Introduced | (A, 5) |
| Senate | (B, 15) |
| Send | (B, 11) |
| Standing | (A, 11) |
| Table | (B, 7) |
| Votes | (B, 3) |
| Whether | (B, 5) |

Master Index — 1401

| Keyword | Document Identifier, (Occurrences) |
|---|---|
| Any | (B, 1) |
| Bill | (B, 9) |
| Congress | (A, 4) (C, 7) |
| Consists | (A, 5) |
| Either | (B, 4) |
| Enact | (C, 9) |
| Follow | (C, 3) |
| House | (A, 13) (B, 5) |
| Houses | (A, 8) |
| Introduce | (B, 7) |
| Legislatures | (C, 2) |
| Member | (B, 2) |
| Processes | (C, 4) |
| Representatives | (A, 15) |
| Senate | (A, 10) |
| Similar | (C, 5) |
| State | (C, 1) |
| States | (A, 3) |
| Statutes | (C, 10) |
| Two | (A, 7) |
| United | (A, 2) |

*Figure 18*

Fresh Index Table — 1701

| Document Identifier | Index Identifier |
|---|---|
| A | Index F |
| B | Index F |

*Figure 19*

QUERY: Where is "Congress" located?

*Figure 20*

Unfiltered Query Result — 2101

| Index Identifier | Keyword | Document Identifier |
|---|---|---|
| Master | Congress | A |
| Master | Congress | C |

Filtered Query Results — 2102

| Keyword | Object Identifier |
|---|---|
| Congress | C |

*Figure 21*

Master Index 2201

| Keyword | (Document Identifier, (Occurrences)) |
|---|---|
| After | (A, 1) |
| Assigned | (A, 8) |
| Bill | (A, 3) (B, 9) |
| Committee | (A, 12) (B, 2) |
| Congress | (C, 17) |
| Enact | (C, 9) |
| Follow | (C, 3) |
| Introduced | (A, 5) |
| Legislatures | (C, 2) |
| Processes | (C, 4) |
| Senate | (B, 15) |
| Send | (B, 11) |
| Similar | (C, 5) |
| Standing | (A, 11) |
| State | (C, 1) |
| Statutes | (C, 10) |
| Table | (B, 7) |
| Votes | (B, 3) |
| Whether | (B, 5) |

*Figure 22*

METHOD AND SYSTEM FOR AUTOMATICALLY INDEXING DATA IN A DOCUMENT USING A FRESH INDEX TABLE

CROSS-REFERENCE TO RELATED APPLICATIONS

This application is a continuation of U.S. patent application Ser. No. 07/995,796, filed Dec. 23, 1992, now abandoned.

TECHNICAL FIELD

This invention relates generally to a computer method and system for indexing data in a document, and more specifically, to a computer method and system for maintaining indexes for multiple documents.

BACKGROUND OF THE INVENTION

For some time now, existing systems have provided the capability to index the contents of documents. These systems typically store indexing data in a data structure so that it can be accessed and manipulated to answer user-generated queries efficiently. An index contains indexing data derived from a document that allows queries about the content of the document to be performed efficiently. For example, an index of a document may contain an alphabetical listing of each major word of the document along with the locations at which the major word appears in the document. These major words are known as keywords and the locations are known as occurrences. The index, when querying the document, can be used to determine the locations of a major word within the document and proximity of major words to one another (e.g., "United" and "States"). An index may contain indexing data derived from multiple documents. The indexing data of a multiple document index contains each major word of the documents, the document identifiers of the documents in which each major word is located, and the locations within each document of the major word. A multiple document index can be used to determine which documents contain a certain major word. If queries are performed only to determine which documents contain keywords and not specific locations or proximity, then the index need not include occurrences.

An example using FIGS. 1 through 4 illustrates a typical method used by existing systems for indexing data in documents. FIG. 1 is a block diagram showing an existing system that creates documents and creates indexes for the documents. A word processing program 101, under user control, creates both document A 102 and document B 103. The word processing program 101, upon user request, uses a file system 104 to save the document A 102 and the document B 103 on a permanent storage device 105.

If the user wishes to perform queries on the data contained in document A 102 or document B 103, then the user first indexes the contents of the documents using indexing program 106. For example, the user invokes indexing program 106 and initiates a request to index document A 102. The indexing program 106 performs the following process for each keyword in document A 102: 1) parse the keyword; 2) assign an occurrence number to the word which indicates the location of the word within the document; 3) retrieve a document identification which uniquely identifies document A 102; and 4) store the <keyword, document identification, occurrence number> tuple in a document index. This index can then be stored on the permanent storage device 105.

FIG. 2 shows a state of a multiple document index 201 after the user invokes indexing program 106 (FIG. 1) and initiates an indexing request for document A 102 and document B 103. Each tuple 205 of the document index 201 is of variable length and consists of a keyword 202, a document ID 203, and an occurrence number 204. A (document ID 203, occurrence number 204) tuple may be repeated within the tuple 205 if the keyword 202 appears in multiple documents. Likewise, occurrence number 204 may be repeated within the (document ID 203, occurrence number 204) tuple for multiple occurrences of the keyword 202 within the document identified by document ID 203. For example, the keyword "courts" appears in document A at occurrences 3 and 16 and in document B at occurrence 6. Thus, tuple 206 of the document index 201 contains "courts (A,3,16) (B,6)."

Returning to FIG. 1, once the indexing program 106 has indexed the document A 102 and the document B 103, the user can perform queries using document index 201. The user invokes a query program 107 and initiates a query request. The query program searches the document index 201 for answers to the query request. For example, a query request to locate all occurrence of "court" within document A or B would return the information that "court" was the tenth keyword in document A.

FIG. 3 is a block diagram showing a state of the system depicted in FIG. 1 after the word processing program 101, under user control, modifies document A 102. In order to reach the state depicted in FIG. 3, the user invokes the word processing program 101 to modify the content of document A 102 using any well-known method for editing the content of documents. The word processing program 101 then stores the edited version of document A 102 on the permanent storage device 105.

In order to index the edited version of document A 102, the user once again invokes the indexing program 106 to perform the following process for each keyword in the edited version of document A 102: 1) parse the keyword; 2) assign an occurrence number indicating the position of the word within the edited version of document A 102; 3) retrieve the document identification number uniquely identifying the document A 102; and 4) store the <keyword, document identification, occurrence number> tuple in a temporary document index. Temporary index 401 (FIG. 4) is the temporary index created by the indexing program 106 when indexing the edited version of document A 102.

Before the user can invoke the query program 107 and initiate a query request on the edited version of document A 102, prior systems typically require the indexing program 106 to have merged the old document index with the temporary index to create a new document index. FIG. 4 is a block diagram of an outdated version of document index 201, the temporary index 401, and an updated version of document index 402. The indexing program 106 merges the outdated version of document index 201 and the temporary index to create the updated version of document index 201 which stores the most up-to-date indexed data for the documents in the system. The document index 201 and the temporary index 401 are merged using any well-known technique for merging similarly structured data files. As can be seen from the new document index 402, the merging of the old document index 201 with the temporary index 401 replaces all references in the old document index 201 to document A with the references to document A from the temporary index 401. The references to document B in the old document index 201 remain unchanged because document B has not been edited.

The existing method described above is deficient in a number of ways. The document index is only updated upon user request. This method is burdensome to users and degrades system performance because the re-regeneration of the document index is not scheduled by the system to be performed during periods of low system activity, but instead must be performed any time the user requests such an action, even if that request coincides with a period of high system activity.

SUMMARY OF THE INVENTION

It is an object of the present invention to provide a method of and system for automatically creating and updating a document index to reflect changes made to a document.

It is another object of the present invention to provide a method of a system for allowing queries to be performed using data in multiple indexes.

These and other objects, which will become apparent as the invention is more fully described below, are provided by an indexing system and query system of the present invention. In a preferred embodiment, the indexing system maintains a master index, multiple shadow indexes, and a fresh table. Initially, the indexing system creates the master index, which contains indexing data for all documents. When new documents are created or existing documents are modified, a file system, which controls the saving of documents, notifies the indexing system that a document has been saved, that is, needs to be indexed or reindexed. The indexing system queues these notifications. Either immediately or at a later time (depending on the current computer system load), the indexing system generates indexes for the documents that are queued. The indexing system creates a shadow index and stores the indexing data for the queued documents in the shadow index. From time to time, the indexing system creates a new shadow index and stores the indexing data for the queued documents. Thus, the indexing system may include multiple shadow indexes in addition to the master index. The indexing system maintains a fresh index table that indicates which index contains the most up-to-date data for each document. Whenever a new shadow index is created, the indexing system stores in the fresh table, for each document whose indexing data is the new shadow index, an entry containing the document identification and the new shadow index identification. If an entry for a document already exists in the fresh table, then that entry is overwritten with the identification of the new shadow index. Thus, the fresh table indicates which shadow index contains the most recent indexing data for each document. If there is no entry in the fresh table for a certain document, then the master index contains the most recent indexing data for that document.

To satisfy a query request, the query system searches the master index and each shadow index. When the fresh table indicates that the information retrieved is not the most up-to-date, then that information is discarded. To improve query system performance, the index system periodically merges multiple indexes into a single index. The indexing system updates the fresh table to reflect that the indexes are merged.

The indexing system preferably is executed as a background process. Thus, because the indexing system may not index a document immediately upon notification of modification, the indexing data in the master index and shadow indexes may be somewhat outdated.

BRIEF DESCRIPTION OF THE DRAWINGS

FIG. 2 is a block diagram of an existing document index.

FIG. 4 is a block diagram depicting an outdated document index and a temporary index which are used to create an updated document index for indexing the content of the documents depicted in FIG. 3.

FIG. 8 is a block diagram of preferred components of a data repository.

FIG. 14 is a block diagram illustrating a master index for the documents of FIG. 13.

FIG. 16 is a block diagram depicting the indexes after documents A and B of FIG. 15 have been modified.

FIG. 17 is a block diagram showing a state of a fresh index table after the indexes of FIG. 16 have been created.

FIG. 18 is a block diagram showing a shadow index F after a shadow index D and a shadow index E have been merged into the shadow index F.

FIG. 19 is a block diagram of a state of the fresh index table after it is updated to reflect the creation of the shadow index F depicted in FIG. 18.

FIG. 20 is a diagram of a query request.

FIG. 21 is a block diagram of query results returned after performing the query on the shadow index F and the master index depicted in FIG. 18.

FIG. 22 is a block diagram of the state of the master index after the shadow index F and master index depicted in FIG. 18 are merged.

DETAILED DESCRIPTION OF THE INVENTION

GENERAL OVERVIEW

The present invention provides a method and system for automatically generating an index containing indexing data for a document. An indexing system maintains a master index and shadow indexes. When a user creates a document, the user typically initiates a request to the filing system to save the document. Once the document has been saved, the filing system automatically notifies the indexing system. The indexing system then indexes the document data and stores the indexing data in a shadow index. Similarly, when the user of the system modifies a document and saves the modifications, the filing system notifies the indexing system.

The indexing system then indexes the data in the modified document and stores the indexing data in a shadow index. The indexing system also maintains the fresh index table indicating which index contains the most up-to-date indexing data for each document. Periodically, the indexing system merges the shadow indexes, which contain indexed data for recently created or modified documents, with the master index.

Figure 1:
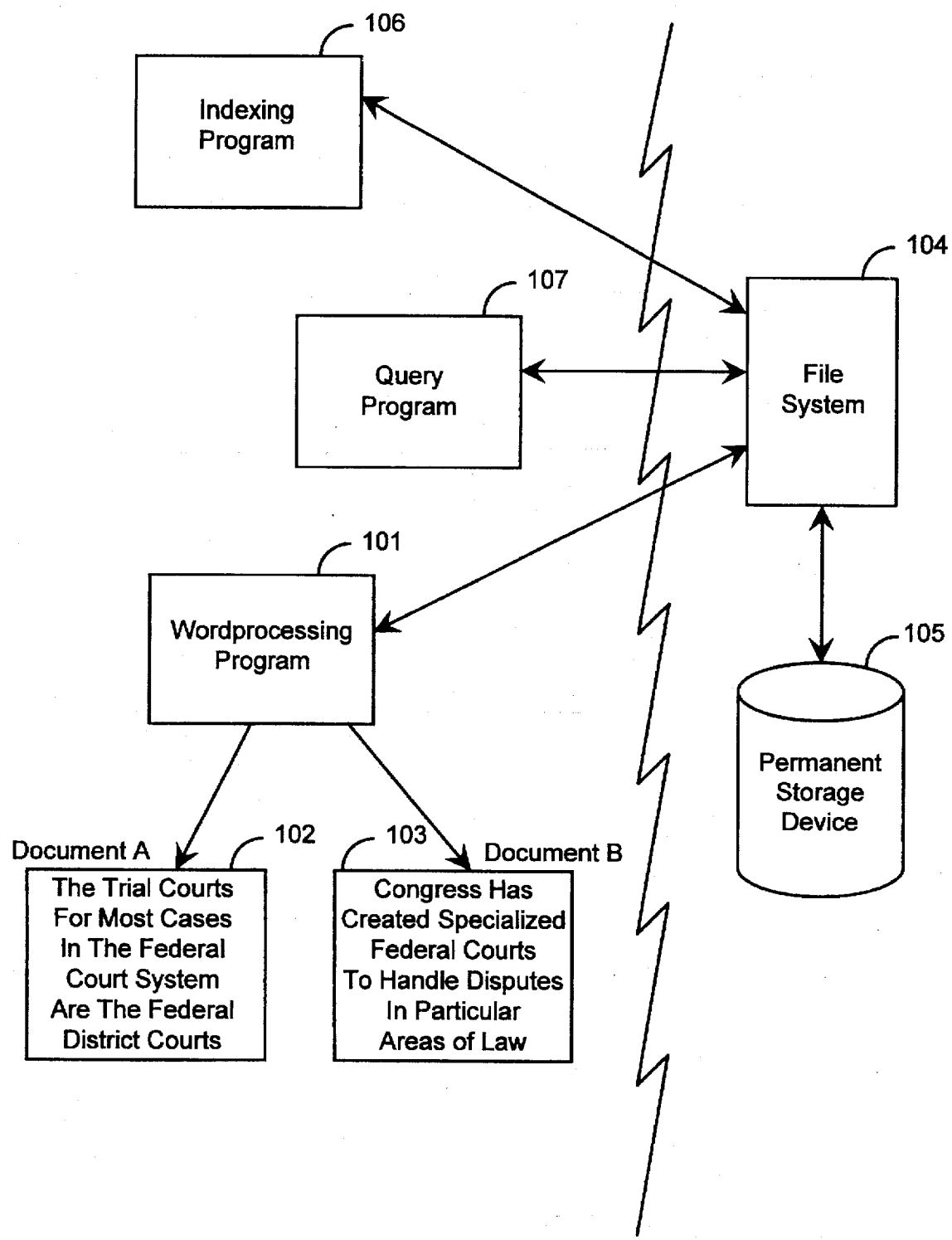
FIG. 1 is a block diagram showing an existing system for indexing a content of a document.
Figure 3:
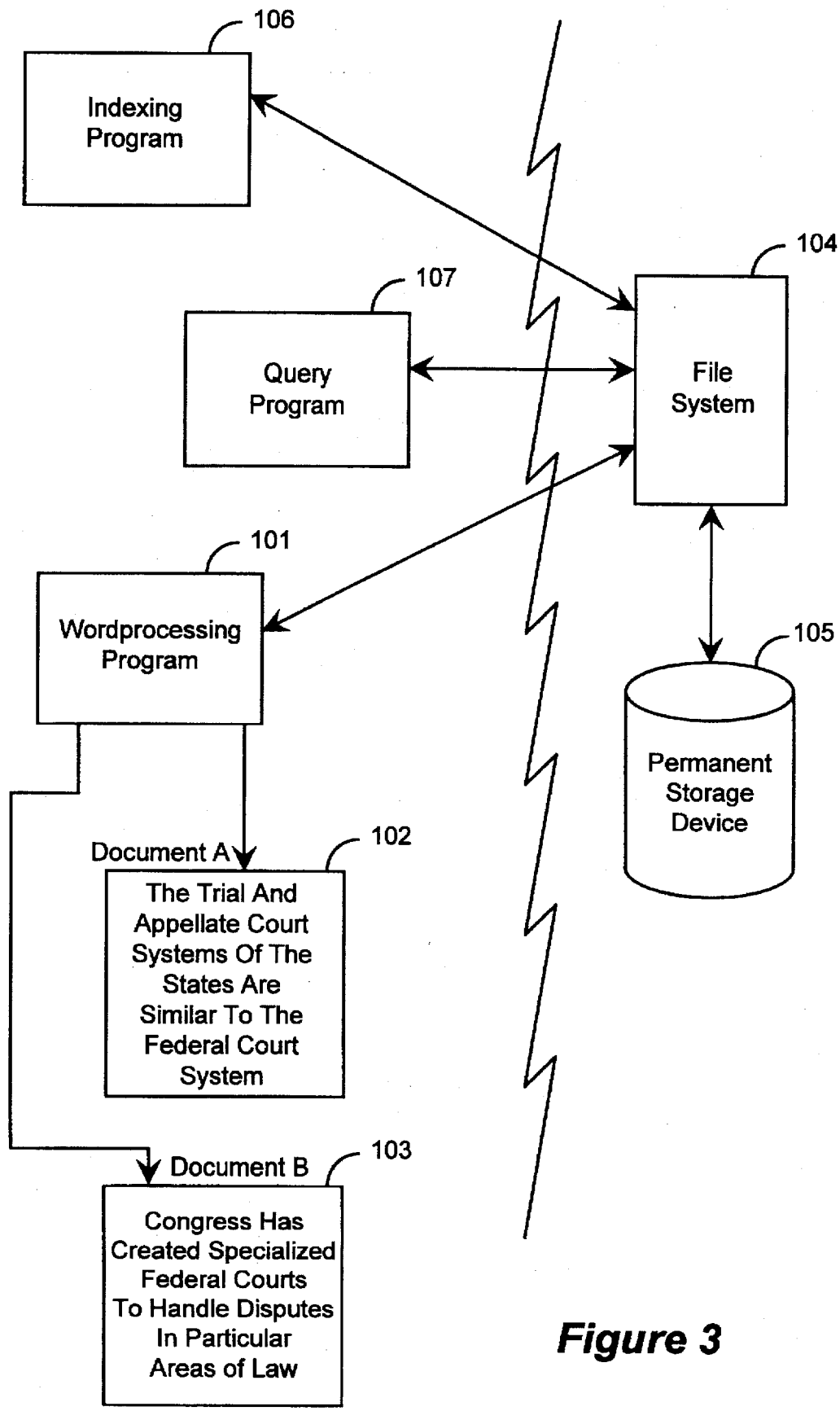
FIG. 3 is a block diagram of the system depicted in FIG. 1, with the content of a document A having been modified.
Figure 5:
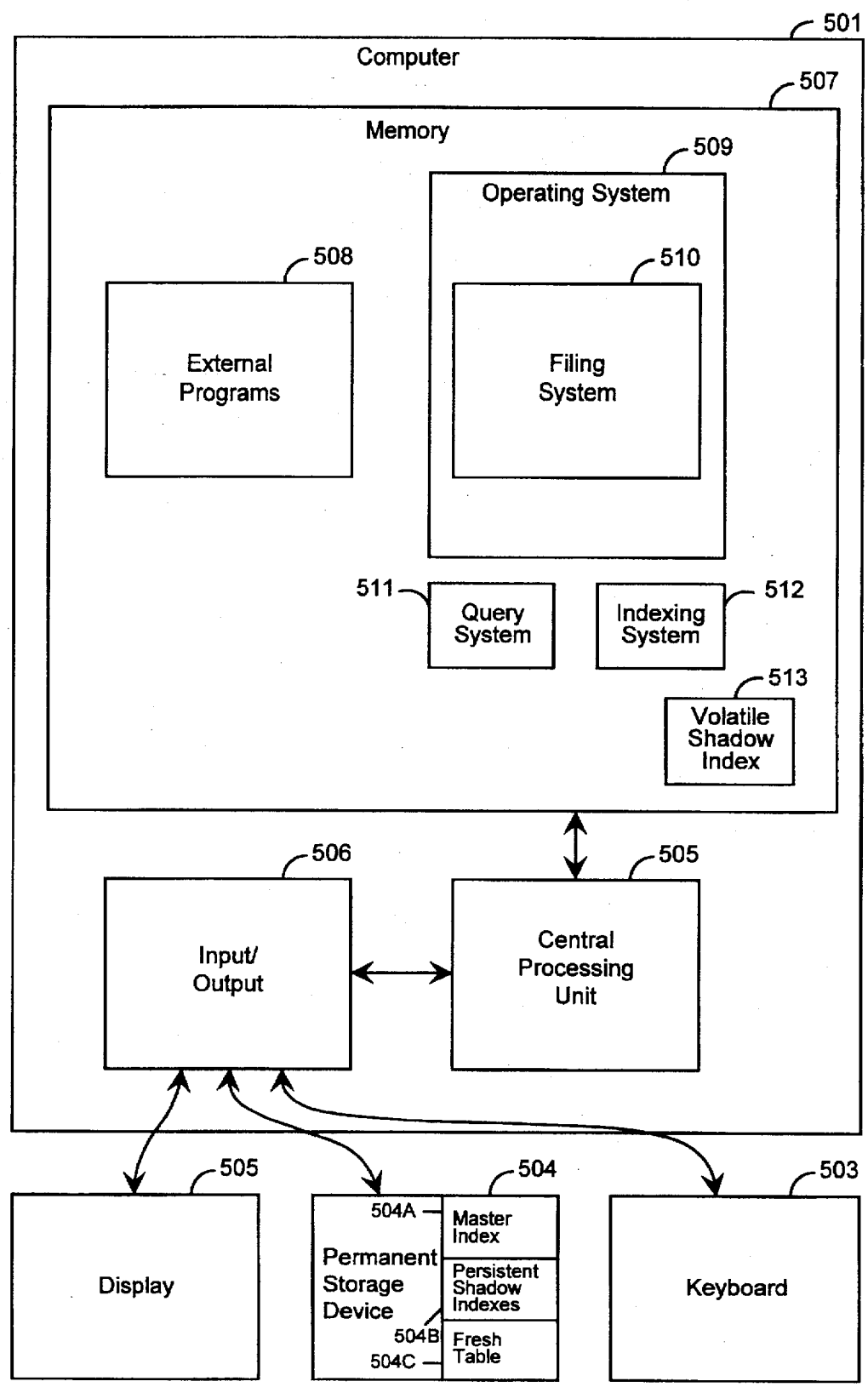
FIG. 5 is a block diagram showing a preferred computer system.

In a preferred embodiment, the components of the computer system depicted in FIG. 5 are used to execute program code to implement the methods of the present invention described in detail below. The computer system of FIG. 5 comprises a computer unit 501, a keyboard 503, a permanent storage device 504, and a display unit 505. The computer unit 501 comprises a central processing unit 505, an input/output interface 506, and computer memory 507. The computer memory 507 contains external programs 508, an operating system 509, query system 511, indexing system 512, and may contain volatile shadow indexes 513. The permanent storage device 504 contains the master index 504A, and may contain persistent shadow indexes 504B and fresh table 504C. In a preferred embodiment, filing system 510 notifies the indexing system 512 whenever a document has been created or updated. The indexing system queues these notifications. The indexing system, operating as a background process, creates shadow indexes and stores the indexing data for the documents in the shadow indexes. External programs 508 interact with the query system 511 to query the documents using the indexes.

The indexing data comprises entries containing a keyword from the document, a document identifier uniquely identifying the document, and an occurrence number indicating the position of the word within the document. Alternatively, a keyword may be a derived keyword that is derived from data in a document, rather than the actual data contained in the document.

Figure 6:
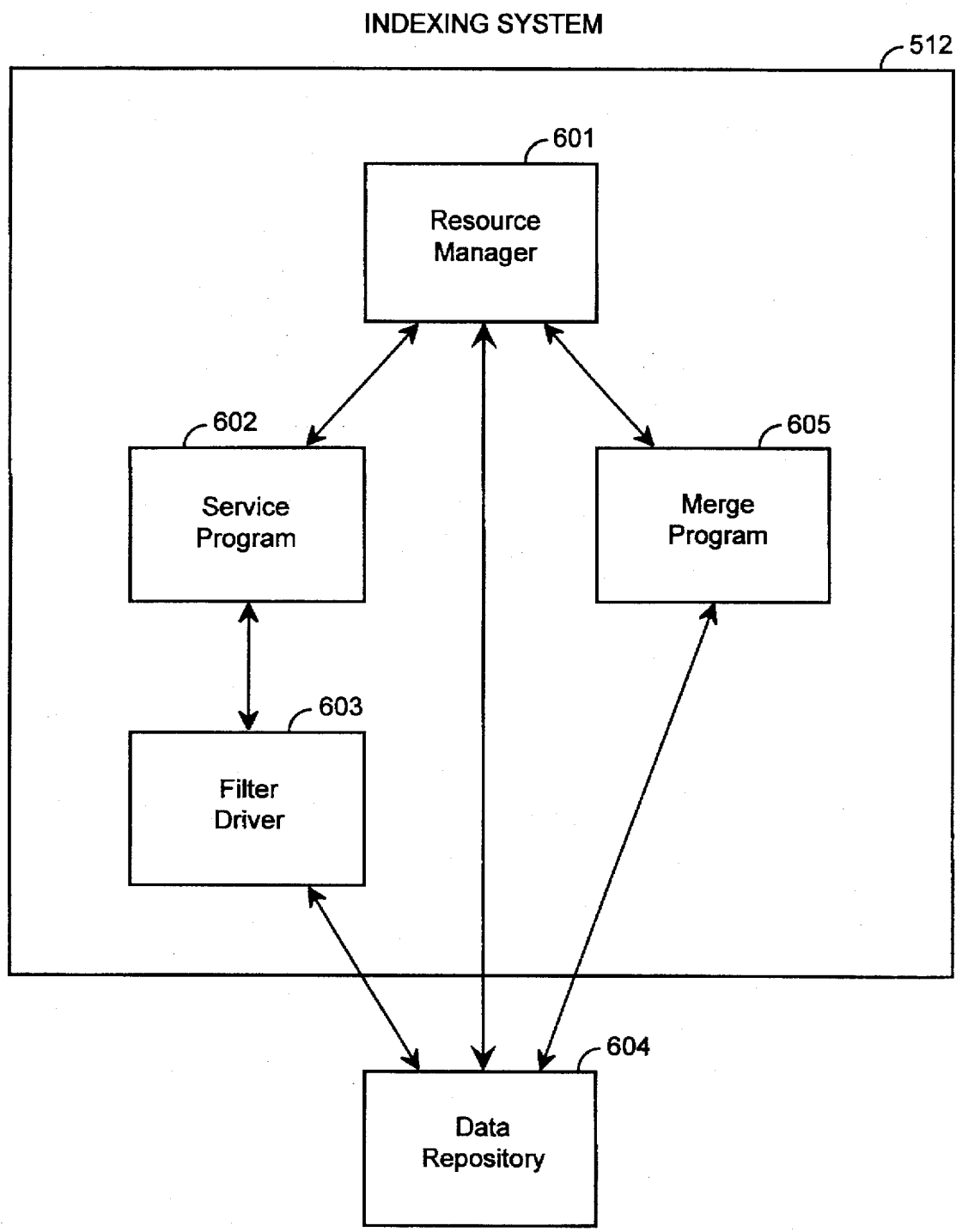
FIG. 6 is a block diagram depicting preferred components of an indexing system.

FIG. 6 is a block diagram depicting components of the indexing system. The indexing system 512 includes a resource manager 601, a service program 602, a filter driver 603, and a merge program 605. The indexing system 512 interacts with data repository 604, which contains the master index, volatile and persistent shadow indexes, and the fresh table.

The resource manager 601 receives notification from the filing system indicating which documents in the system have been created or modified, that is, need to be indexed or reindexed. Resource manager 601 queues these notifications and monitors the activity in the computer system to determine an appropriate time at which to index the documents. Typically, the length of time since a notification was received factors into this determination. When it is appropriate to index the documents, the resource manager 601 invokes the service program 602 indicating which documents need to be indexed.

The service program creates a shadow index for storage of the indexing data and launches filter driver 603. For each document to be indexed, the filter driver 603 parses each keyword in the document and associates an occurrence number with the word indicating the position of the word within the document. Then the filter driver 603 preferably stores indexing data comprising the word, a document identifier uniquely identifying the document in the newly-created index, and the occurrence number. Filter driver 603 then updates the fresh index table to indicate that the newly-created index contains the most up-to-date data for the indexed documents.

Over time a number of shadow indexes can be created and maintained concurrently by the indexing system. In order to increase system performance, it is desirable to merge the shadow indexes together to form a smaller number of new shadow indexes, or to merge shadow indexes into the master index. To accomplish this merging, the resource manager 601 invokes a merge program 605 indicating which indexes, called source indexes, are to be merged. The merge program 605 merges the source indexes into a destination index.

As will be described in more detail below, some of the shadow indexes stored in the data repository 604 are stored temporarily in the computer memory while other shadow indexes are stored on a permanent storage device. The shadow indexes stored in computer memory are referred to as volatile shadow indexes, and the shadow indexes store on the permanent storage device are persistent shadow indexes. Because access time within one index stored on a permanent storage device is approximately constant regardless of the index size, computer system performance is improved when all the indexing data is stored in a single index. Thus, the resource manager 601 places a relatively high priority on merging indexes stored on the permanent storage device into a single index.

The query system 511 performs queries using the indexes. In general, the query system 511 retrieves indexing data relevant to the query request from the indexes and then determines if the retrieved indexing data is up-to-date using the fresh index table. If the query system 511 determines that the retrieved index data is not up-to-date, then the query system 511 discards the retrieved data, else the query system 511 sends the retrieved data to an external program 508 as a query result.

Figure 7:
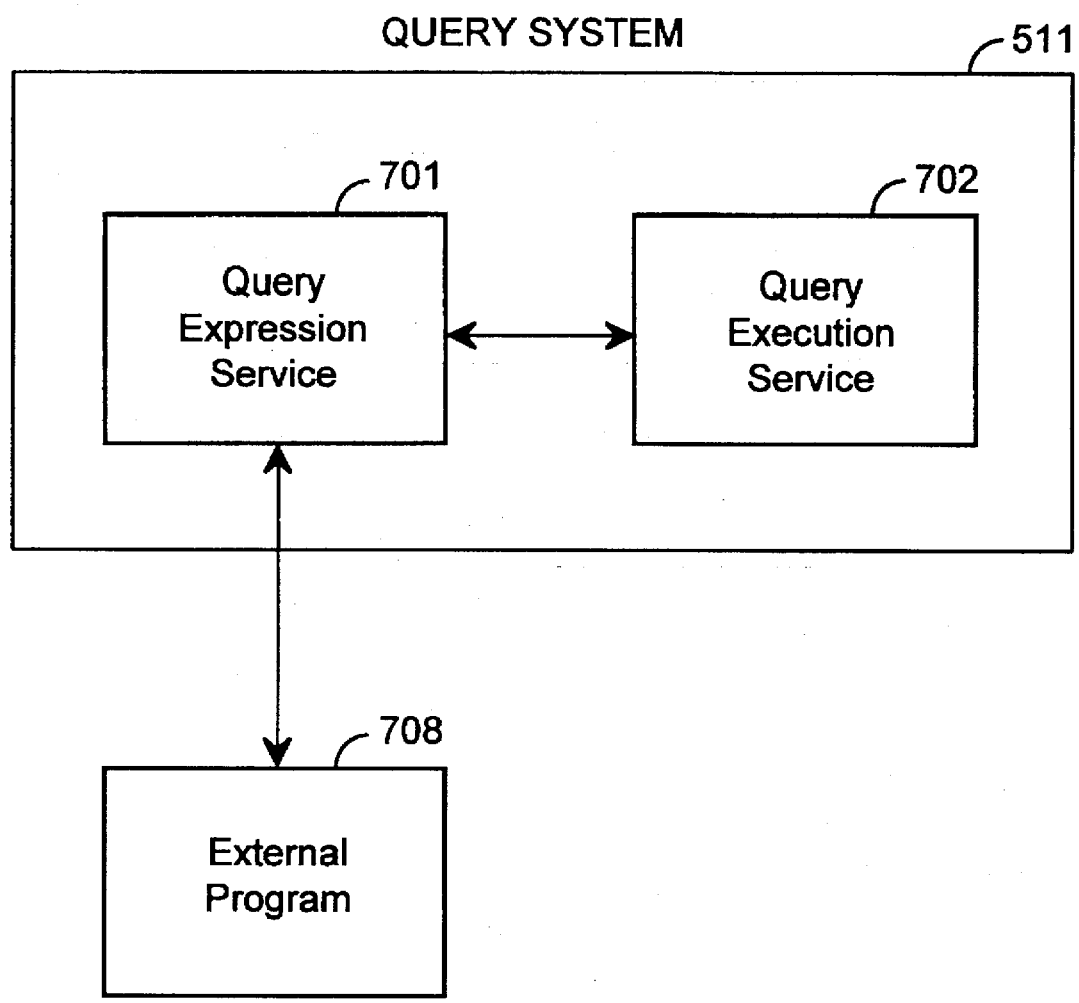
FIG. 7 is a block diagram of the components of a query system.

FIG. 7 is a block diagram of components of a preferred query system 511. The query system 511 preferably includes a query expression service 701 and a query execution service 702. The query expression service 701 receives a query request from an external program, parses the query request, and analyzes the restrictions parsed from the query request. Based on the analysis, the query expression service 701 selects the manner in which to search the indexes for data to satisfy the query request.

The query execution service 702 retrieves the indexing data from the indexes. Any well-known technique in the art for retrieving data satisfying a query request can be used. Once the data has been retrieved, the query execution service 702 sends the retrieved data to the query expression service 701. The retrieved data includes an identification of the index from which the data is retrieved.

The query expression service 701 compares the retrieved data against data stored in a fresh index table (described in more detail below). The fresh index table indicates which index contains the most up-to-date indexing data for a document. If the retrieved data is from an index that contains up-to-date indexing data for the document, then the retrieved data is returned as the query result, else the retrieved data is discarded.

DATA STRUCTURES

FIG. 8 illustrates data structures used in a preferred embodiment of the present invention. FIG. 8 is a block diagram of the data repository 604. The data repository 604 includes a changes table 801, a fresh index table 802, and the indexes 803. The changes table 801 contains entries having a document identifier 804 and a time stamp 805. When the filing system notifies the indexing system 512 that a document is ready to be indexed, the resource manager 601 stores the document identifier 804 and the time stamp 805 in the changes table 801. A document identifier uniquely identifies the document to be indexed, and a time stamp indicates the time at which the resource manager 601 received notification. Resource manager 601 preferably uses the time stamp 805 to determine when to index the document identified by document identifier 804.

The indexes 803 are the indexes created after the resource manager 601 initiates the indexing of the documents identified in the changes table 801. In a preferred embodiment of the present invention, the indexes 803 comprise volatile shadow indexes 806, persistent shadow index 807, and a master index 808.

The volatile shadow index 806 is preferably stored in a high-speed computer memory, and typically indexes a small number of documents. Each tuple (entry) of the volatile shadow index 806 preferably includes a keyword 809 containing one keyword, a document identifier 810 uniquely identifying the document that contains the keyword, and an occurrence 811 containing the relative location within the document of the keyword. In a preferred embodiment, each keyword can be associated with multiple documents and each document can be associated with multiple occurrences, which can be represented as the "<keyword (document identifier, (occurrence))>" tuple.

The persistent shadow index 807 and the master index 808 preferably contain the same type of data as stored in the volatile shadow index 806. A primary difference between the indexes is that the data in the persistent shadow index 807 and the master index 808 are persistently stored in a highly compressed format, whereas data in the volatile shadow index is nonpersistently stored in a less compressed format. During the merging process, as discussed below, the indexing data in volatile shadow index are persistently stored in either a persistent shadow index or the master index.

Fresh index table 802 contains data indicating which of the indexes contains the most up-to-date data for each document. A preferred embodiment of the fresh index table 802 contains tuples with a document identifier 812 and an index identifier 813. The index identifier 813 corresponds to the index containing the most up-to-date data for the document identified by the document identifier 812. In a preferred embodiment of the present invention, data pertaining to the master index is not stored in the fresh index table 802. For example, if the master index contained the most up-to-date data for a document A, then a tuple for document A is not stored in the fresh index table. Thus, when the fresh index table does not contain an entry for a document, then the master index contains the most up-to-date indexing data for that document.

As indicated above query expression service 701 compares the data retrieved from the indexes by the query execution service 702 with the data stored in the fresh index table 802 and thereby determines if the retrieved data is up-to-date. The query execution service 702 generates <document identifier, index identifier> tuples corresponding to data retrieved from the indexes. The query expression service 701 determines whether the fresh index table 802 contains the generated <document identifier, index identifier> tuple. If the fresh index table 802 does not contain such a tuple, then the retrieved data is the most up-to-date. If the fresh index table 802 does contain such a tuple, and the retrieved index identifier is the same as the index identifier in the fresh index table entry, then the retrieved data is the most up-to-date. Otherwise, the retrieved data is not the most up-to-date and is discarded.

INDEXING

Figure 9:
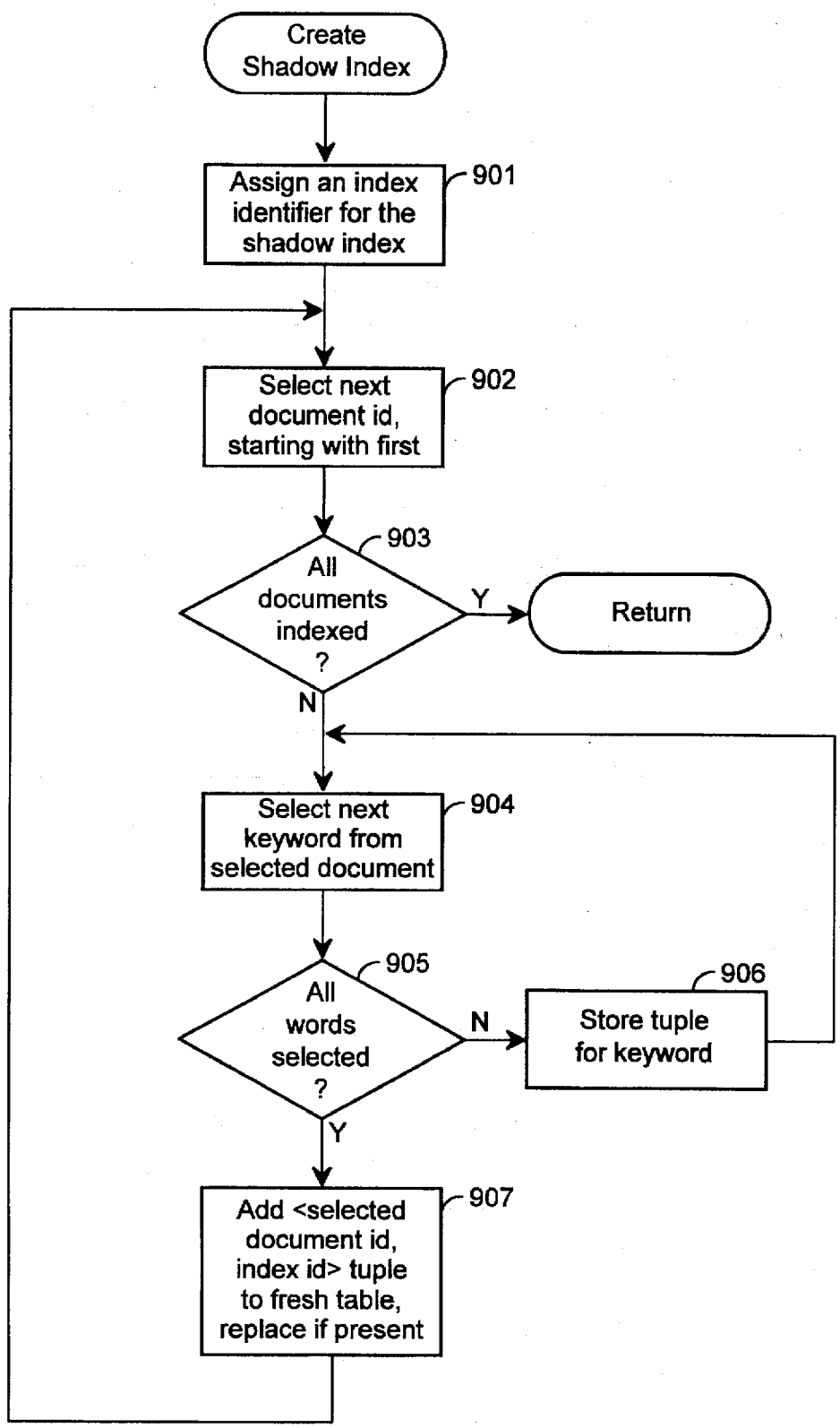
FIG. 9 is a flow diagram of a function CreateShadowIndex.

FIG. 9 is a flow diagram of the function Create_Shadow_Index. This function generates an index containing indexing data from one or more documents. This function is preferably invoked by filter driver 603. This function is passed a list of document identifiers, creates a volatile shadow index, and stores the indexing data from the documents in the volatile shadow index. From time to time, the indexing system merges these volatile shadow indexes into a persistent shadow index. The indexing data consists of keywords from the documents to be indexed, the document identifier, and the locations of the keywords within each document.

In step 901, the function creates a volatile shadow index and assigns a unique index identifier. In step 902, the function selects the next document that is identified in the passed list starting with the first. In step 903, if all the documents have been selected, then the function returns, else the function continues at step 904. In step 904, the function selects the next keyword in the selected document starting with the first keyword. In step 905, if all the keywords have already been selected, then the function continues at step 907, else the function continues at step 906. In step 906, the function stores a tuple containing the keyword, identifier of selected document, and occurrence in the shadow index and loops to step 904 to select the next keyword. In step 907, the function updates the fresh index table to indicate that this shadow index contains the most up-to-date indexing data for the selected document. The function then loops to step 902 to select the next document.

MERGING

Figure 10:
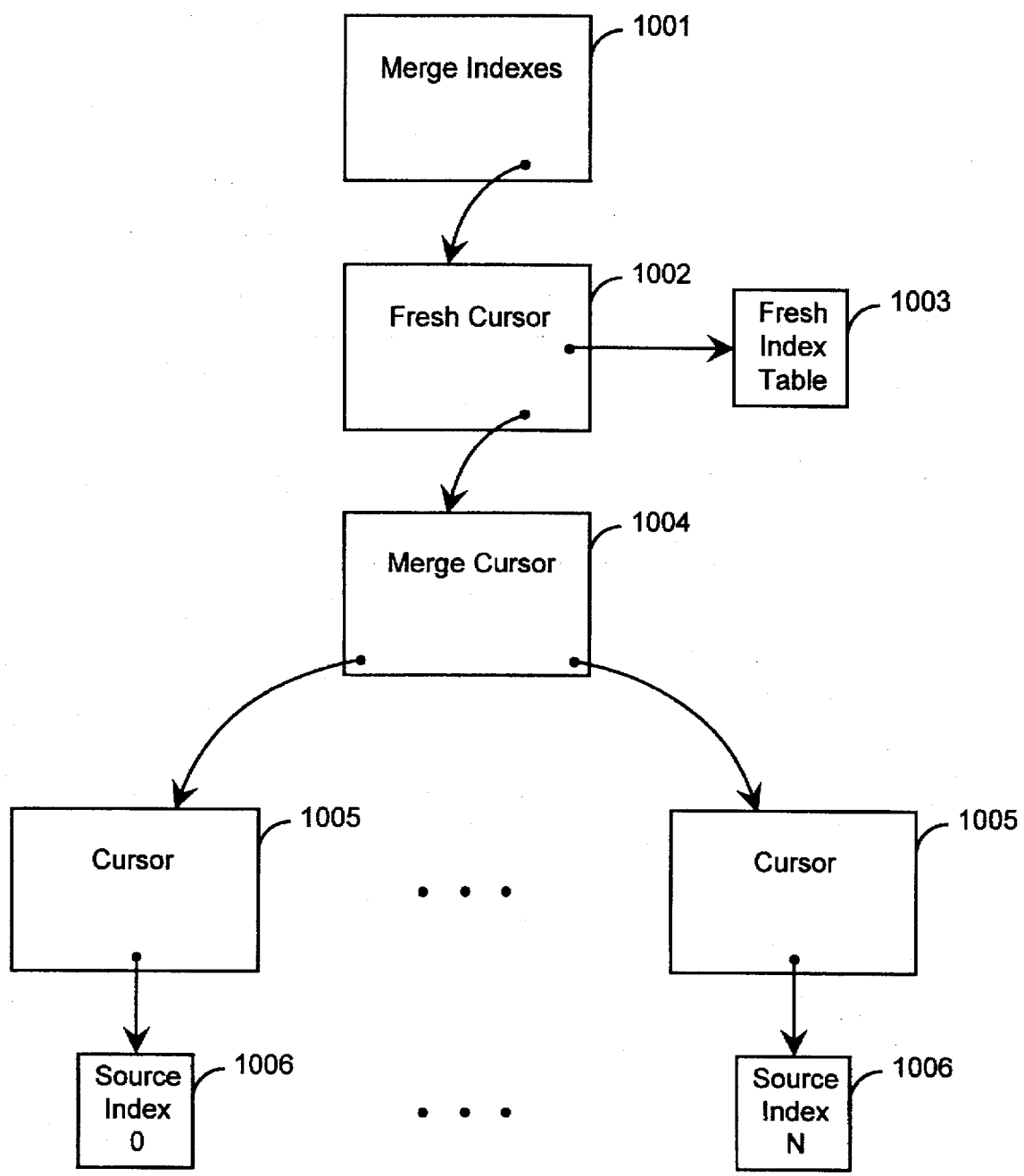
FIG. 10 is a block diagram illustrating the merging of indexes.

FIG. 10 is a block diagram illustrating the merging of indexes. In a preferred embodiment, the merge program 605 determines which indexes, known as source indexes, are to be merged into a newly-created destination index. After the merge is complete, each of the source indexes are then deleted. The merge program 605 updates the fresh index table to indicate that the destination index contains the most up-to-date indexing data for each of the documents whose most up-to-date indexing data was in a source index. In a preferred embodiment, the merge program is implemented using object-oriented programming techniques.

As shown in FIG. 10, the function MergeIndexes instantiates an IndexCursor object 1005 for each source index (represented by Index objects 1006), instantiates a MergeCursor object 1004, and instantiates a FreshCursor object 1002. The constructor for the MergeCursor object is passed an array of the instantiated IndexCursor objects. The constructor for the FreshCursor is passed the MergeCursor object and a FreshTable object 1003. The FreshTable object comprises the fresh table and methods to access the fresh table. Each Index object comprises indexing data and methods to access the indexing data. The IndexCursor, MergeCursor, and FreshCursor objects are derived from the abstract class Cursor. In the following C++ pseudocode is used. The C++ programming language is described in "The Annotated C++ Reference Manual," by Ellis and Stroustrup, published by Addison Wesley Publishing Company.

CODE TABLE 1

```
class Cursor
{
public:
    virtual Key          Key( )=0;
    virtual int          NextKey( )=0;
```

CODE TABLE 1

```
virtual DocId      DocId( )=0;
virtual int        NextDocId( ) = 0;
}
```

The abstract class Cursor as shown in Code Table 1 defines four methods: Key, NextKey, DocId, and NextDocId. These methods combine to return keys and document identifiers in sorted order for the indexes associated with the Cursor object. The method Key returns the current key of the associated indexes. The method NextKey advances the current key to the next key. The method DocId returns the current document identifier. The method NextDocId advances the current document identifier to the next document identifier for the current key. The abstract class Cursor can also be defined to return occurrence information for the associated indexes. For simplicity of explanation, the following description assumes that the indexes do not contain occurrence data. In operation, the methods of the FreshCursor object return only up-to-date data retrieved from is source Cursor object. The FreshCursor object retrieves each key and document identifier from the source Cursor object in sorted order by invoking the methods of the source Cursor object. The FreshCursor object ensures that the document identifiers that it returns represent up-to-date data by validating them against the fresh table. The MergeCursor object retrieves the keys and document identifiers from source Cursor objects. The MergeCursor object tracks the current key and document identifier of each source Cursor object to return the keys and document identifiers in sorted order. Each IndexCursor object implements the methods of the Cursor class. These methods return the keys and document identifiers of the associated index in sorted order.

The Index objects defines the methods: NewKey, NewDocID, NextKey, and NextDocId. The method NewKey adds the passed key to the index. The method NewDocId adds the passed document identifier to the current key of the index. The method NextKey advances the current key. The method NextDocId advances the current document identifier within the current key.

CODE TABLE 2

```
void MergeIndexes (Index *pSource,
          int cSource,
          FreshTable &fresh,
          Index &Dest)
{
   Cursor **aCursor = CreateIndexCursors (pSource, cSource);
   MergeCursor Merge (aCursor, cSource);
   FreshCursor Fresh (Merge, fresh);
   while (<not all keys processed>)
   {
     Dest.NewKey(Fresh.Key( ));
     while (<not out of docid for current key>)
     {
       Dest.NewDocId(Fresh.DocId( ));
       Dest.NextDocId( );
     }
     Dest.NextKey( );
   }
   if (<Dest is a master index>)
   {
     for (<each source index>)
        {<remove all entries for the source index>}
   }
   else
   {
     for (<each source index>)
        {<replace all entries for the source index with Dest>}
   }
}
```

Code Table 2 contains C++ pseudocode that describes the function MergeIndexes. The function is passed pSource, which is a pointer to an array of source Index objects; cSource, which is count of the source index objects; fresh, which is the fresh table object; and Dest, which is the destination index object. The function MergeCursor invokes the function CreateIndexCursors to create an array of IndexCursor objects. The function CreateIndexCursors instantiates an IndexCursor object for each source Index object in the array pSource. The array is returned as the value of the function. The function MergeIndexes then instantiates a MergeCursor object named Merge. The MergeCursor constructor is passed the array of IndexCursor objects as its source Cursor objects. The function MergeIndexes then instantiates a FreshCursor object named Fresh. The FreshCursor constructor is passed the MergeCursor object, Merge, and the FreshTable object, fresh. The function MergeIndexes then loops invoking the method Fresh.Key to retrieve the current key and, within that loop, loops invoking the method Fresh.DocId to retrieve each document identifier for the retrieved key. The function MergeIndexes adds the returned keys and document identifiers to the destination index using the methods of the destination Index object, Dest. After the destination index is created, the function MergeIndexes updates the fresh table. If the destination index is a master index, then for each source index, the function removes associated entries in the fresh table. If the destination is not a master index, then for each source index, the function updates all entries for the source index in the fresh table to refer to the destination index.

CODE TABLE 3

```
class FreshCursor: public Cursor
{
public:
   FreshCursor (Cursor &source,
            FreshTable &fresh)
       : _fresh (fresh),
         _source (source),
         _key (source.Key( )),
         _docid (source.DocId( ))
   {}
   virtual Key Key( )
   {return _key;}
   virtual int NextKey( )
   {return _source.NextKey( );}
   virtual DocId DocId( )
   {return _docid;}
   virtual int NextDocId( )
   {
     while(<there is a valid _docid>)
     {
       _docid = source.DocId( );
       IndexId iid = _source.IndexId( );
       if(<_docid> is in _fresh>)
       {
         if(<iid matches _fresh.IndexId(_docid)>)
            {break;}
       }
       else
       {break;}
       _source.NextDocId( );
     }
     return(<TRUE if _docid is valud>);
   }
```

CODE TABLE 3

```
private:
    FreshTable  &_fresh;
    Cursor      &_source;
    Key         _key;
    DocId       _docid;
};
```

Code Table 3 is C++ pseudocode that defines the Fresh-Cursor class. The FreshCursor class inherits the abstract class Cursor. The constructor is passed a source Cursor object, typically the MergeCursor, and a fresh table object. The constructor stores a reference to these parameters as data members. The constructor also initializes data members _key and _docid to the first key and document identifier of the source Cursor object. The methods Key and DocId return the current key and document identifier, respectively. The method NextKey returns the next key from the source Cursor object. The method NextDocId loops retrieving document identifiers from the source Cursor object and the identifiers of the indexes from which they are retrieved. (The Cursor class also defines a method IndexId, which returns the index identifier of the index from which the current document identifier is retrieved.) The method then determines if the retrieved document identifier is in the fresh table. If the retrieved document identifier is in the fresh table and the index identifier in the fresh table matches the retrieved index identifier, then the document identifier represents up-to-date data and the method breaks out of the loop. If the retrieved document identifier is not in the fresh table, then the retrieved document identifier also represents up-to-date data and the method breaks out of the loops. When neither of the conditions occur, then the data is out-of-date and the method retrieves the next document identifier from the source Cursor object and continues with the loop.

CODE TABLE 4

```
class MergeCursor: public Cursor
{
public:
    MergeCursor(Cursor **pSource,
            int cSource)
        : _pSource (pSource),
          _cSource (cSource)
    { <set_iCurrentIndex to index with smallest <key,docid>>}
    virtual Key Key( )
    {return _pSource[iCurrentIndex]->Key( );}
    virtual int NextKey( )
    {
        pSource[_iCurrentIndex]->NextKey( );
        <set_iCurrentIndex to index in_pSource with smallest<key, docid>>
    }
    virtual DocId Docid( )
    {return _pSource[iCurrentIndex]->DocId( );}
    virtual int NextDocId( )
    {
        _pSource[_iCurrentIndex]->NextDocId( );
        <set_iCurrentIndex to index in_pSource with smallest<key,docid>>
    }
private:
    Cursor  **_pSource;
    int     _cSource;
    int     _iCurrentIndex;
};
```

Code Table 4 is C++ pseudocode that defines the Merge-Cursor class. The MergeCursor class inherits the abstract class Cursor. The constructor is passed an array of the Cursor objects and count of the Cursor objects. The constructor stores references to these passed parameters as data members and initializes the data member _i CurrentIndex to the index within the array of Cursor object with the smallest key and document identifier combination. The methods Key and DocId return the current key and document identifier of the Cursor object indexed by the data member _iCurrentIndex, respectively. The method NextKey advances the Cursor object indexed by data member _i CurrentIndex to the next key and sets data member _iCurrentIndex to the index within the array of the Cursor object with the next smallest key and document identifier combination. The method Next-DocId advances the Cursor object indexed by data member _iCurrentIndex to the next document identifier and sets data member _iCurrentIndex to the index within the array of the Cursor object with the next smallest document identifier for the current key.

QUERY

Figure 11:
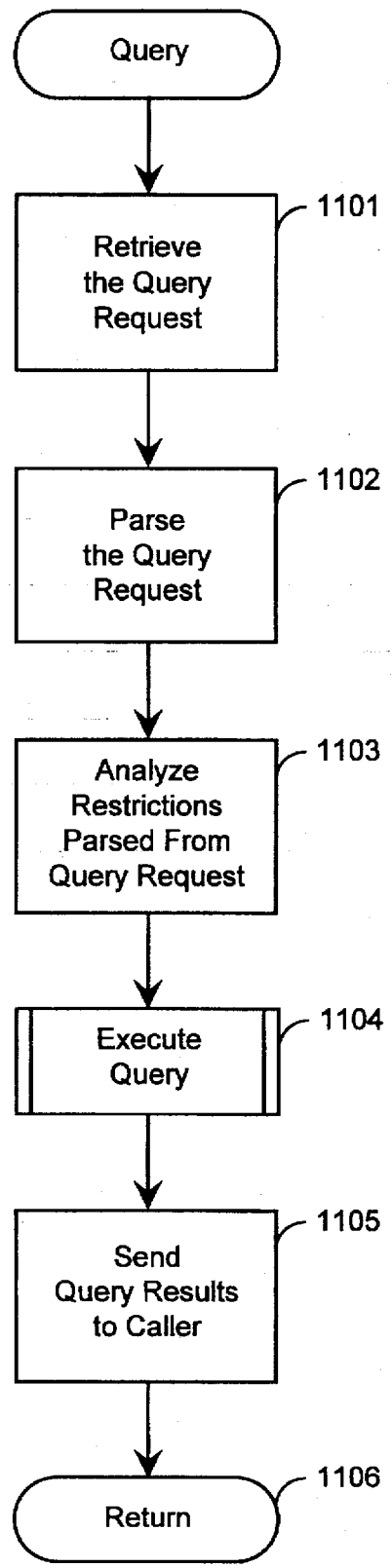
FIG. 11 is a flow diagram of a function Query.
Figure 12:
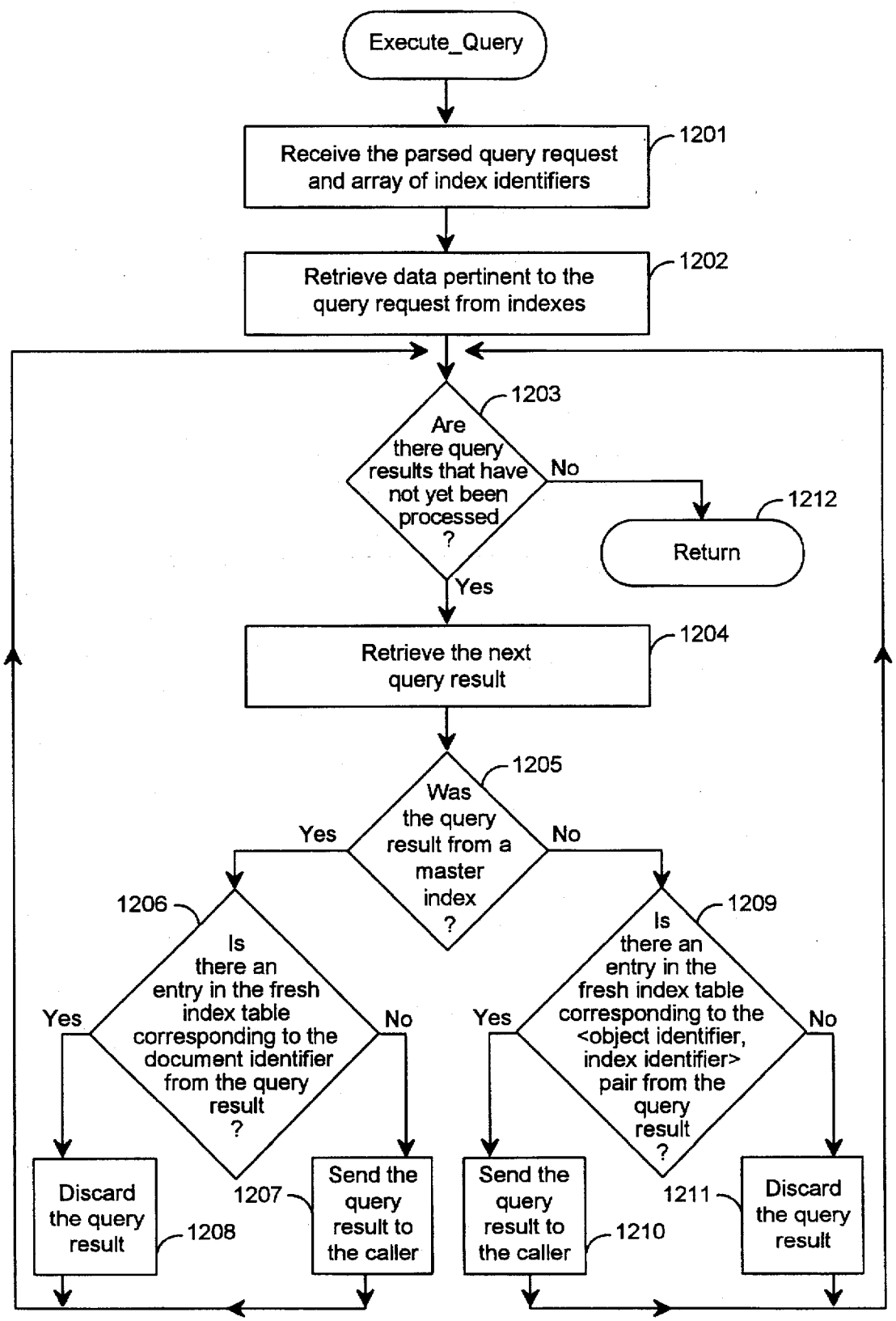
FIG. 12 is a flow diagram of a function Execute_Query.

FIGS. 11 and 12 are flow diagrams of a preferred method of querying the indexes. In a preferred embodiment of the present invention, the query method is performed by query system 511.

FIG. 11 is a flow diagram of the function Query. This function receives a query request initiated by an external program and searches the indexes for pertinent data it can use to answer the query request. In step 1101, the function retrieves the query request. In step 1102, the function parses the query request. In step 1103, the function analyzes the restrictions parsed from the query request. In step 1104, the function Query invokes the function Execute_Query to retrieve data from the indexes. In step 1105, the function Query returns all query results to the caller. In step 1106, the function Query returns to its caller.

FIG. 12 is a flow diagram of the function Execute_Query. This function receives a parsed query request and an array of index identifiers, and retrieves data from the indexes pertinent to the query request. In a preferred embodiment of the present invention, the function Execute_Query is performed by Query Execution Service 702

In step 1201, the function Execute_Query receives the parsed query request and the array of index identifiers. In step 1202, the function retrieves data pertinent to the query request, called query results, from the indexes.

Steps 1203-1211 process the retrieved query results by returning query results that are up-to-date and by discarding query results that are not up-to-date. In step 1203, the function determines if query results exist that have not yet been processed. If unprocessed query results exist, steps 1204-1211 are performed. In step 1204, the function retrieves the next unprocessed query result. In step 1205, the function determines whether the query result was retrieved from the master index. If the query result was retrieved from the master index, then processing continues with steps 1206-1208. In step 1206, the function determines if there is a tuple in the fresh index table containing the same document identifier from the query result. A tuple in the fresh index table corresponding to the document identifier from the query result indicates that a shadow index exists with more up-to-date data about the document than the master index. Therefore, the function in step 1208 discards the query result. Upon completion of step 1208, processing continues with step 1203.

If the fresh index table does not contain a tuple corresponding to the document identifier from the query result, then the master index contains the most up-to-date data about the document. Thus, the function, in step 1207, sends the query result to the caller of the function. Upon completion of step 1207, processing continues with step 1203.

Referring to step 1205, if the query result was not from a master index, then processing continues with steps 1209–1211. In step 1209, the function determines if the fresh index table contains a tuple corresponding to the <document identifier, index identifier> pair from the query result. If a correspondence exists, then the shadow index contains the most up-to-date data about the document, and the function, in step 1210, sends the query result to the caller of the function Execute_Query. Upon completion of step 1210, processing continues at step 1203. If the fresh index table does not contain a tuple corresponding to the <document identifier, index identifier> pair from the query result, then another shadow index exists which contains the most up-to-date data about the document. Therefore, the function, in step 1211, discards the query result. Upon completion of step 1211, processing continues with step 1203.

In step 1203, if the function determines that all query results have been processed, then the function Execute_Query returns to its caller in step 1212.

SPECIFIC EXAMPLE

Figure 13:
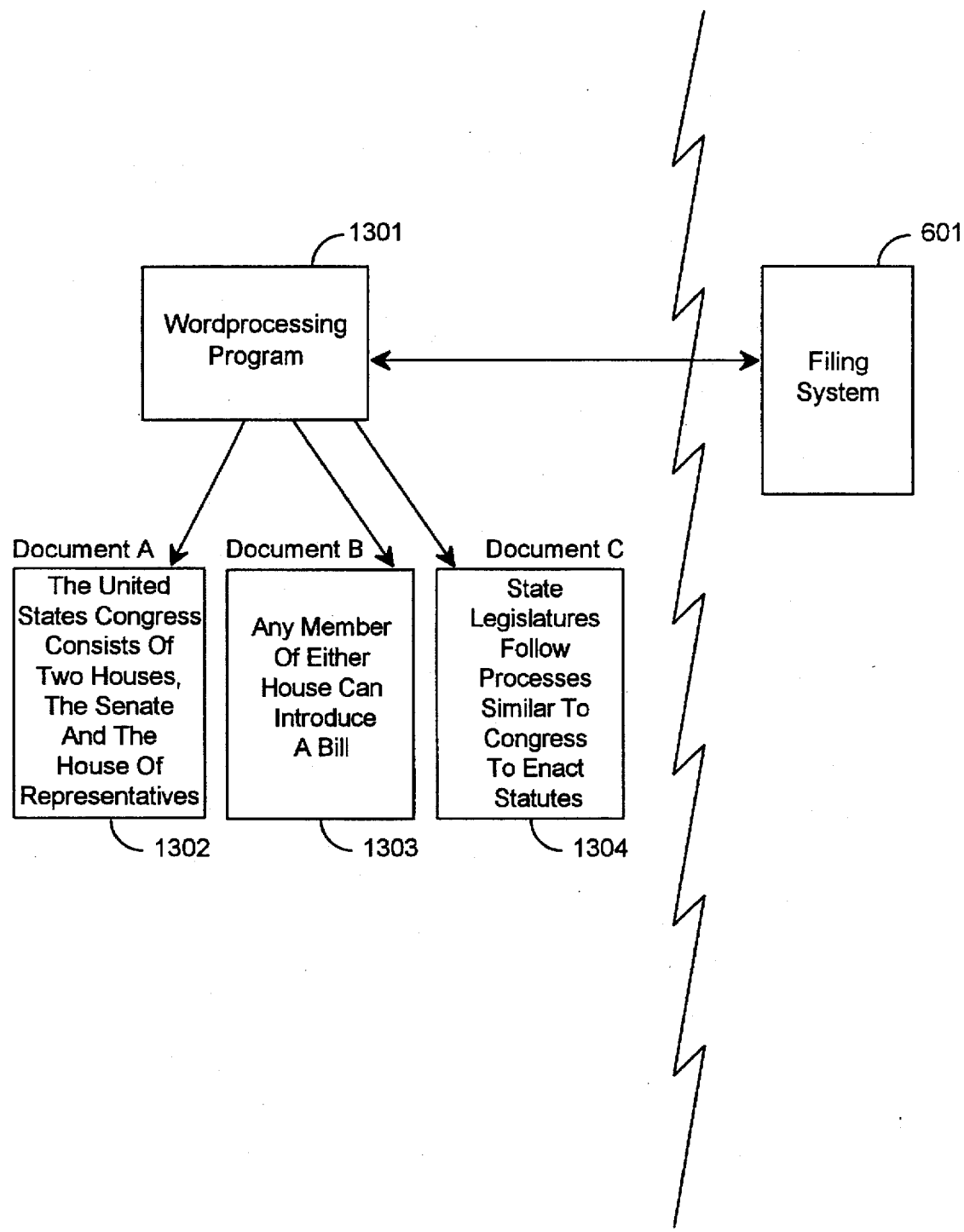
FIG. 13 is a block diagram of a preferred embodiment of the major components for creating and indexing documents.

A specific example will help illustrate a preferred method of and system for indexing data in the document. FIGS. 13 and 14 are block diagrams indicating an initial state of the system in this example. Word processing program 1301, upon user request, creates documents A 1302, document B 1303, and document C 1304. Word processing program 1301 then saves the documents using filing system 510. The filing system notifies the indexing system 512, which creates the master index 1401.

Figure 15:
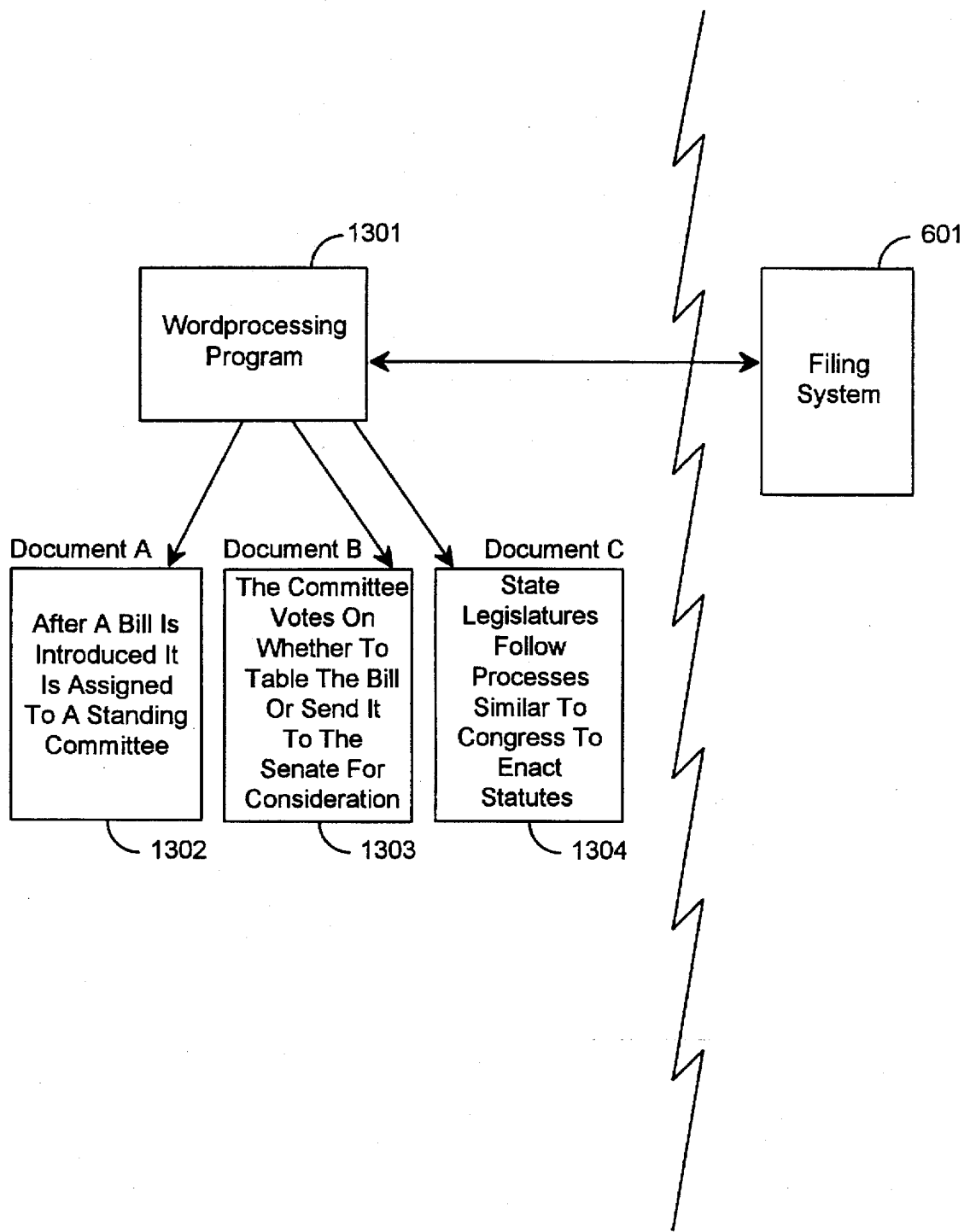
FIG. 15 is a block diagram depicting a state of the system shown in FIG. 13 after a document A and a document B have been modified.

FIG. 15 is a block diagram illustrating a state of the system after the word processing program 1301, upon user request, modifies the contents of document A 1302 and document B 1303 and then saves the documents using the filing system. The contents of document C 1304 remain unchanged. The filing system saves the document A 1302 and the document B 1303 using any of the well known techniques for saving data on permanent storage devices. Once the document A 1302 and the document B 1303 have been saved, the filing system notifies the index system indicating that document A 1302 and document B 1303 are ready to be indexed.

FIG. 16 is a block diagram of a state of the content indexes after the edited versions of document A 1302 and document B 1303 have been indexed by the indexing system. Shadow index D 1601 contains the indexing data from the edited version of document A 1602. Shadow index E 1602 contains the indexing data from the edited version of document B 1303. Master index 1401 remains unchanged.

FIG. 17 is a block diagram depicting a state of the fresh index table 1701 after the shadow index D 1601 and the shadow index E 1602 have been created. The indexing system stores data in the fresh index table 1601 indicating which indexes contain the most up-to-date data for document A 1302 and document B 1303. Because the shadow index D 1601 contains the most up-to-date index data for document A 1302, the indexing system stores the document identifier "A" and the index identifier "index D" in the fresh index table 1701. Because the shadow index E 1602 contains the most up-to-date data for the document B 1303, the indexing system stores the document identifier "B" and the index identifier "index E" in the fresh index table 1701.

At an appropriate point in time, typically when system resources are under-utilized, the indexing system merges the shadow index D 1601 and the shadow index E 1602 into the shadow index F 1801 (FIG. 18). Because the shadow index D 1601 and the shadow index E 1602 contain the most up-to-date data for document A 1402 and document B 1403, respectively, all the index data from the shadow index D 1601 and the shadow index E 1602 appears in the shadow index F 1801. As is indicated by FIG. 18, both shadow index F 1801 and master index 1401 are the only indexes in the system after the merge.

FIG. 19 is a block diagram depicting a state of the fresh index table 1701 after the indexing system has merged the shadow index D 1601 and the shadow index E 1602 into the shadow index F 1801. Because shadow index F 1801 contains the most up-to-date data for both document A 1302 and document B 1303, the fresh index table 1701 associates the index identifier "Index F" with both the document identifier "A" and the document identifier "B."

Figure 20:
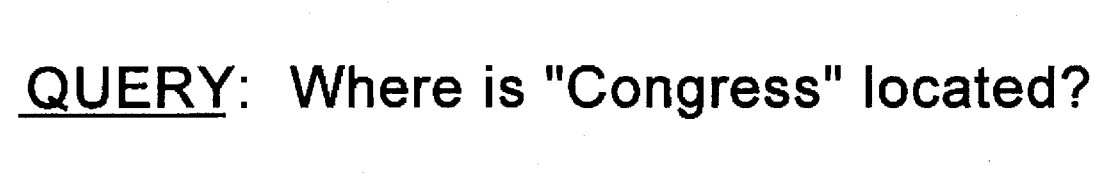

FIG. 20 depicts a query entered by the user requesting the system to determine what documents contain the word "congress."

FIG. 21 is a block diagram of an unfiltered query result 2101 and a filtered query result 2102. The unfiltered query result 2101 is the result of the query system searching both the shadow index F 1801 and the master index 1401 for data pertinent to the query. As can be seen by the unfiltered query result 2101, the master index indicates that two documents, A and C, contain the word "congress." The shadow index F does not contain the word "congress." Before returning the query result to the user, the query system compares the data in the unfiltered query result 2101 with the data in the fresh index table 1701 (FIG. 19). As is indicated by the filtered query result 2102, the indexing system determines that the shadow index F 1801 contains the most up-to-date data about the document A. Thus, the information about document A, which was collected from the master index, is discarded.

FIG. 22 is a block diagram of the master index 2201 after the indexing system merges the shadow index F 1801 with the master index 1401. The shadow index F 1801, as indicated by the fresh index table 1701 (FIG. 19), contains the most up-to-date data for document "A" and document "B." Therefore, the indexing data from the shadow index F 1801 corresponding to the document "A" and the document "B" are stored in the master index 2201, while the indexing data corresponding to the document "A" and the document "B" from the master index 1401 are discarded. Because the master index 1401 contains the most up-to-date data corresponding to the document C 1304, the indexing data corresponding to document "C" from master index 1401 are stored in the master index 2201.

Figure 23:
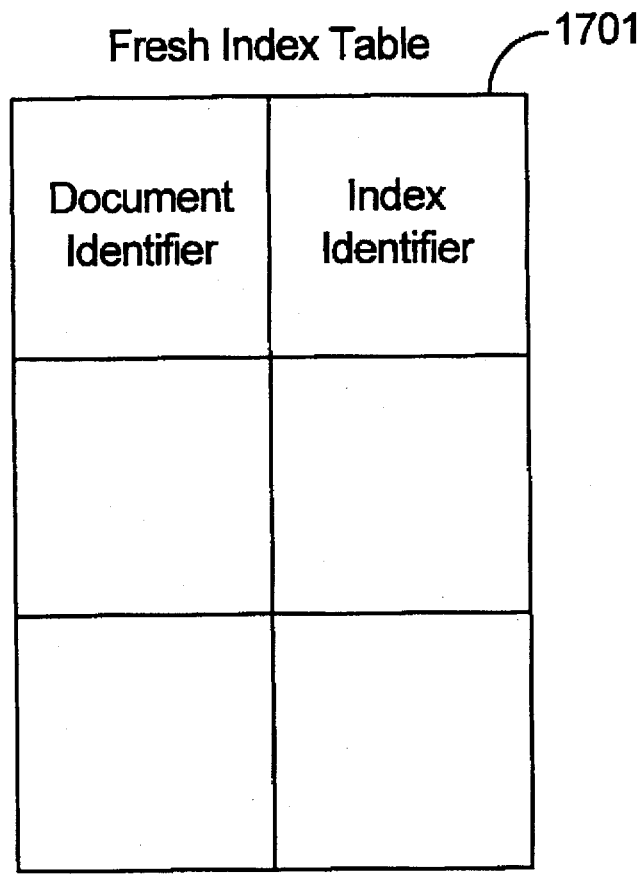
FIG. 23 depicts the state of the fresh index table after it is updated to reflect the creation of the master index depicted in FIG. 22.

FIG. 23 is a block diagram of the fresh index table 1701 after the shadow index F 1801 and the master index 1401 have been merged into the master index 2201. Because a preferred fresh index table 1701 does not store <document identifier master index> tuples, the fresh index table 1701 contains no data, indicating that the most up-to-date data corresponding to all the document is stored in the master index 2201.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. In a data processing system having documents, a plurality of indexes, and a fresh index table, each document having an associated index containing out-of-date indexing information for the document and having an associated index containing up-to-date indexing information that supersedes the out-of-date indexing information for the document, the fresh index table having entries that indicate the index having the up-to-date indexing information for each document, a method comprising the steps of:

receiving a request to determine which of the documents contains a keyword;

accessing the indexes to retrieve aggregate indexing information that indicates the documents containing the keyword, the aggregate indexing information comprising both up-to-date indexing information and out-of-date indexing information; and for each of the documents containing the keyword, accessing the fresh index table with the aggregate indexing information to determine the index having the up-to-date indexing information for the document and to identify the up-to-date indexing information for the document from among the aggregate indexing information.

2. The method of claim 1 wherein the step of receiving a request further includes the step of receiving the request in response to user input.

3. The method of claims 1 wherein the aggregate indexing information contains the keyword, at least one document identifier for the keyword and at least one occurrence for each document identifier.

4. In a data processing system having documents, a plurality of indexes, and a fresh index table, each document having an index containing indexing information for the document, a plurality of the documents being revised documents having a plurality of indexes, each revised document having an index containing out-of-date indexing information and an index having up-to-date indexing information that supersedes the out-of-date indexing information, the fresh index table having an entry for each revised document indicating which of the indexes has the up-to-date indexing information for the revised document, a method for automatically indexing one of the revised documents comprising the steps of:

receiving an indication that the revised document has been updated such that the up-to-date indexing information for the revised document is out of date;

creating an index containing new up-to-date indexing information for the revised document; and updating the entry in the fresh index table for the revised document to reflect that the created index contains the new up-to-date indexing information for the revised document.

5. The method of claim 4 wherein the documents that are not revised documents are non-revised documents, and wherein the method further includes the steps of receiving an indication that one of the non-revised documents has been updated, generating an index containing up-to-date indexing information for the non-revised document, and adding an entry to the fresh index table to reflect that the generated index contains the up-to-date indexing information for the non-revised document.

6. In a data processing system having documents, a plurality of indexes, and a fresh index table, a first type of index being a master index having indexing information for all documents at system startup and a second type of index being a shadow index having indexing information for at least one document that is updated at system runtime, the fresh index table having entries that indicate a shadow index having a most recent indexing information for a document, a method for merging indexes comprising the steps of:

accessing the shadow indexes and the master index to retrieve indexing information for all of the documents, wherein at least one document has less recent indexing information in the master index and most recent indexing information in one of the shadow indexes;

accessing the fresh index table to determine most recent indexing information for all of the documents from the retrieved indexing information; and creating an index containing the most recent indexing information for all of the documents.

7. The method of claim 6 wherein the step of creating an index includes the step of creating a second master index containing the most recent indexing information for all of the documents.

8. In a data processing system having documents, indexes, and a fresh index table, each index containing indexing information for at least one document, the fresh index table having entries, each entry indicating an index having a most recent indexing information for one of the documents, a method for automatically indexing one of the documents comprising the steps of:

creating a first index for the document containing up-to-date indexing information comprising keywords, a document identifier, and an occurrence;

determining when the document is updated such that the up-to-date indexing information is out of date; and creating a second index containing new up-to-date indexing information for the document and updating the fresh index table to reflect that the second index contains the new up-to-date indexing information for the document.

9. The method of claim 8 wherein the data processing system has a file system for storing documents and wherein the step of determining when the document is updated includes the step of receiving a notification from the file system indicating that the document has been updated.

10. The method of claim 9 wherein the step of receiving a notification includes the step of receiving a notification from the file system indicating that the document has been updated in response to user input.

11. The method of claim 8 wherein the data processing system has resources, and wherein the method includes the steps of determining utilization of the resources, and when the resources are underutilized, creating the second index for the document.

12. In a data processing system having documents, a plurality of indexes containing indexing information for the documents, and a fresh index table, a first type of index being a master index and a second type of index being a shadow index, the fresh index table having entries, each entry indicating which shadow index has up-to-date indexing information for one of the documents, a method for automatically indexing documents comprising the steps of:

accessing the documents;

creating a master index containing up-to-date indexing information for the documents, wherein the indexing information contains a keyword, at least one document identifier for each keyword, and at least one occurrence for each document identifier;

receiving an indication that one of the documents has been updated such that the up-to-date indexing information for the document is out of date;

creating a shadow index for the document containing new up-to-date indexing information; and adding an entry into the fresh index table indicating that the shadow index contains the new up-to-date indexing information for the document.

13. The method of claim 12 wherein the step of creating a master index includes the step of creating the master index containing indexing information from the documents, wherein the indexing information contains a derived keyword that is derived from data in the document.

14. The method of claim 12, further including the steps of:
receiving an indication that a second document has been updated;
creating a second shadow index for the second document; and
adding an entry into the fresh index table indicating that the second shadow index contains most recent indexing information for the second document.

15. The method of claim 14, further including the step of merging the first shadow index and the second shadow index to create a third shadow index.

16. The method of claim 15 wherein the data processing system has resources and wherein the step of merging the first shadow index includes the step of determining when the resources are underutilized and when it is determined that the resources are underutilized, merging the first shadow index and the second shadow index to create a third shadow index.

17. The method of claim 15, further including the step of storing the third shadow index persistently.

18. The method of claim 12, further including the step of merging the shadow index and the first master index to create a second master index.

19. The method of claim 18 wherein the data processing system has resources and wherein the step of merging the shadow index includes the step of determining when the resources are underutilized and when it is determined that the resources are underutilized, merging the shadow index and the first master index to create a second master index.

20. An automatic document index system comprising:
a plurality of documents;
a master index containing indexing information for the documents that is stored at startup of the automatic document index system;
a plurality of shadow indexes, wherein a shadow index is generated when a document is updated such that the indexing information for the document in the master index becomes out of date and wherein the shadow index contains up-to-date indexing information for the document that is updated;
a fresh index table containing entries, each entry indicating which shadow index has the up-to-date indexing information for one of the documents; and
a query component for receiving a request for indexing information, for retrieving indexing information from the master index that satisfies the request, for retrieving indexing information from the shadow indexes that satisfies the request, for accessing the fresh index table with the retrieved indexing information from the master index and the shadow indexes to determine up-to-date indexing information that satisfies the request and for returning the up-to-date indexing information that satisfies the request.

21. A method in a computer system for identifying which of a plurality of documents contain a requested keyword, each document containing words, certain words being designated as keywords, the method comprising:
creating a master index that contains, for each keyword, an indication of which documents contain that keyword;
receiving an indication that one or more documents have been updated;
creating a shadow index that contains, for each keyword, an indication of which of the updated documents contain that keyword;
creating a fresh index table with an indication of each updated document;
receiving a request to identify which documents contain the requested keyword;
identifying from the master index which documents contain the requested keyword and which documents are not indicated in the fresh index table; and
identifying from the shadow index which updated documents contain the requested keyword
wherein each of the identified documents contains the requested keyword.

22. In a data processing system having documents, a master index containing indexing information for the documents when the documents are indexed for a first time, a plurality of shadow indexes each containing indexing information for a document when the document is indexed for at least a second time, and a fresh index table having entries that indicate a shadow index having a most recent indexing information for a document, a method comprising the steps of:
receiving a query for indexing information;
generating query results that satisfy the received query by accessing the master index and the shadow indexes;
determining which of the generated query results contains most recent indexing information by accessing the fresh index table; and
returning the query results containing the most recent indexing information.

23. A method in a computer system for identifying which of a plurality of documents contain a requested keyword, each document containing words, certain words being designated as keywords, the method comprising:
creating a master index that contains, for each keyword, an indication of which documents contain that keyword;
receiving an indication that one or more documents have been updated;
creating a shadow index that contains, for each keyword, an indication of which of the updated documents contain that keyword;
receiving a request to identify which documents contain the requested keyword;
identifying from the master index which documents contain the requested keyword and have not been updated; and
identifying from the shadow index which updated documents contain the requested keyword
wherein each of the identified documents contains the requested keyword.

24. A computer-readable medium whose contents cause a data processing system to index documents, the data processing system having a plurality of indexes and a fresh index table, each document having an associated index containing out-of-date indexing information for the document and having an associated index containing up-to-date indexing information that supersedes the out-of-date indexing information for the document, the fresh index table having entries that indicate the index having the up-to-date indexing information for each document, by performing the steps of:
receiving a request to determine which of the documents contains a keyword;

accessing the indexes to retrieve aggregate indexing information that indicates the documents containing the keyword, the aggregate indexing information comprising both up-to-date indexing information and out-of-date indexing information; and for each of the documents containing the keyword, accessing the fresh index table with the aggregate indexing information to determine the index having the up-to-date indexing information for the document and to identify the up-to-date indexing information for the document from among the aggregate indexing information.

25. The computer readable medium of claim 24 wherein the step of receiving a request further includes the step of receiving the request in response to user input.

26. The computer readable medium of claim 24 wherein the aggregate indexing information contains the keyword, at least one document identifier for the keyword and at least one occurrence for each document identifier.

27. A computer-readable medium whose contents cause a data processing system to merge indexes, the data processing system having documents, a plurality of indexes and a fresh index table, a first type of index being a master index having indexing information for all documents at system startup and a second type of index being a shadow index having indexing information for at least one document that is updated at system runtime, the fresh index table having entries that indicate a shadow index having a most recent indexing information for a document, by performing the steps of:

accessing the shadow indexes and the master index to retrieve indexing information for all of the documents;

accessing the fresh index table to determine most recent indexing information for all of the documents from the retrieved indexing information; and creating an index containing the most recent indexing information for all of the documents.

28. A computer-readable medium whose contents cause a data processing system to index documents, the data processing system having a plurality of indexes containing indexing information for the documents, and a fresh index table, a first type of index being a master index and a second type of index being a shadow index, the fresh index table having entries, each entry indicating which shadow index has up-to-date indexing information for one of the documents, by performing the steps of:

accessing the documents;

creating a master index containing up-to-date indexing information for the documents, wherein the indexing information contains a keyword, at least one document identifier for each keyword, and at least one occurrence for each document identifier;

receiving an indication that one of the documents has been updated such that the up-to-date indexing information for the document is out of date;

creating a shadow index for the document containing new up-to-date indexing information; and adding an entry into the fresh index table indicating that the shadow index contains the new up-to-date indexing information for the document.

29. The computer-readable medium of claim 28 wherein the step of creating a master index includes the step of creating the master index containing indexing information from the documents, wherein the indexing information contains a derived keyword that is derived from data in the document.

30. The computer-readable medium of claim 28, further including the steps of:

receiving an indication that a second document has been updated;

creating a second shadow index for the second document; and adding an entry into the fresh index table indicating that the second shadow index contains most recent indexing information for the second document.

31. The computer-readable medium of claim 30, further including the step of merging the first shadow index and the second shadow index to create a third shadow index.

32. The computer-readable medium of claim 31 wherein the data processing system has resources and wherein the step of merging the first shadow index includes the step of determining when the resources are underutilized and when it is determined that the resources are underutilized, merging the first shadow index and the second shadow index to create a third shadow index.

33. The computer-readable medium of claim 31, further including the step of storing the third shadow index persistently.

34. The computer-readable medium of claim 28, further including the step of merging the shadow index and the first master index to create a second master index.

35. The computer-readable medium of claim 34 wherein the data processing system has resources and wherein the step of merging the shadow index includes the step of determining when the resources are underutilized and when it is determined that the resources are underutilized, merging the shadow index and the first master index to create a second master index.

* * * * *